C. H. MERRILL.
AIR PUMPING ATTACHMENT FOR WATER PUMPS.
APPLICATION FILED NOV. 1, 1909.
972,390.
Patented Oct. 11, 1910.
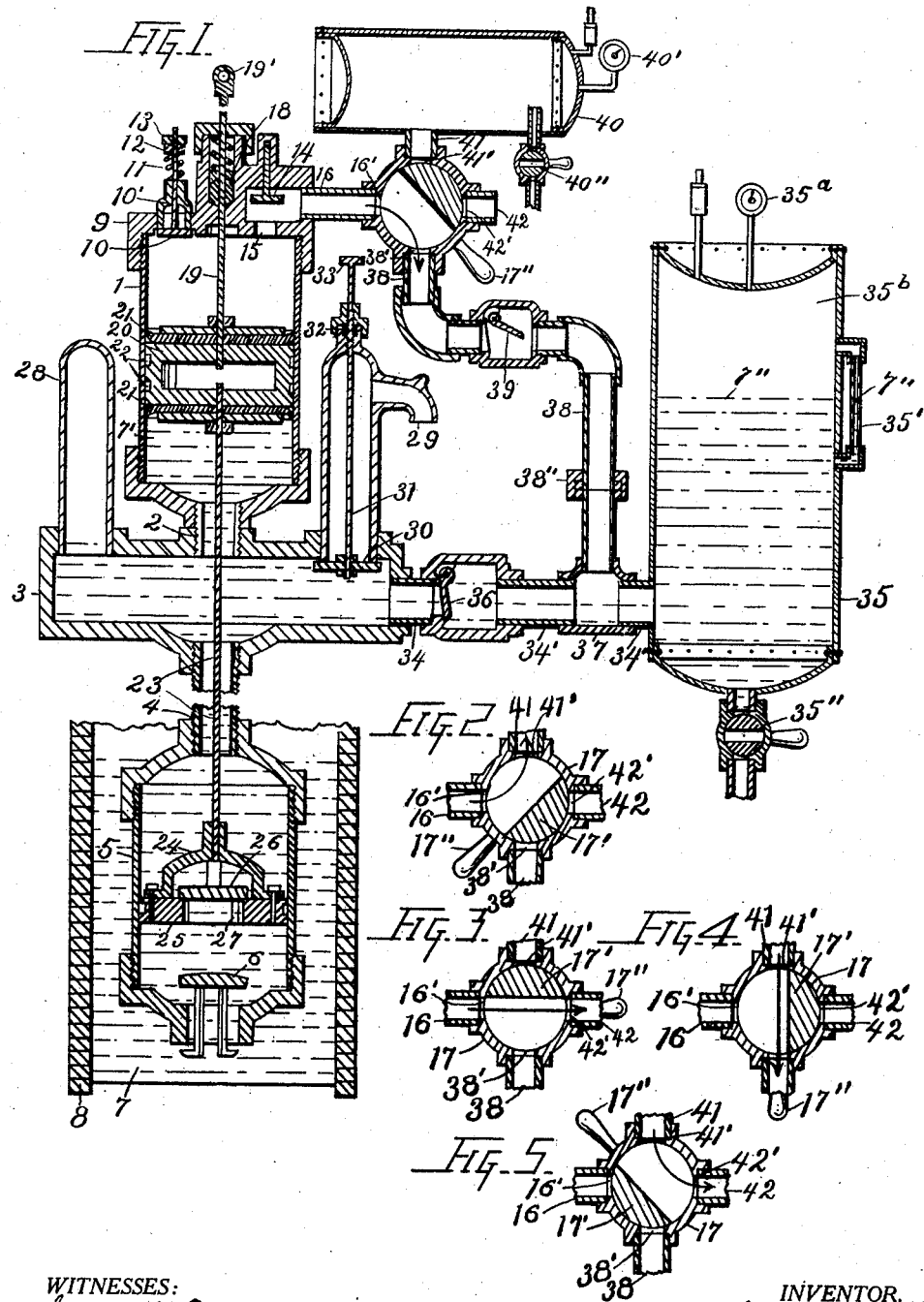
WITNESSES:
Eugene H. Beaugy
Luke E. Hinton
INVENTOR,
Calvin H. Merrill
BY George W. Hinton
ATTORNEY.

UNITED STATES PATENT OFFICE.

CALVIN H. MERRILL, OF SHENANDOAH, IOWA.

AIR-PUMPING ATTACHMENT FOR WATER-PUMPS.

972,390.  Specification of Letters Patent.  Patented Oct. 11, 1910.

Application filed November 1, 1909. Serial No. 525,804.

*To all whom it may concern:*

Be it known that I, CALVIN H. MERRILL, a citizen of the United States, residing at Shenandoah, in the county of Page and State of Iowa, have invented certain new and useful Improvements in Air-Pumping Attachments for Water-Pumps, of which the following is a specification, reference being had therein to the accompanying drawing.

My invention relates to improvements in that class of air pumping attachments, which are designed to be attached to ordinary, single acting water pumps, and the objects of my improvements are, first; to provide a neat, simple, substantial and durable attachment of this class, which can readily be attached to the head of an ordinary water pump, and when so attached, will pump air under pressure at the same time that water is pumped by said water pump; second, to so construct said attachment, that said pumped water shall effectually cool the interior of the cylinder of said attachment and be forced therefrom, under pressure, by the piston in said cylinder; third, to provide air and water directing means, and air and water storing means, whereby said pumped air and said pumped water, may be either directed together into one ordinary storage tank, commonly termed a pressure tank, or be separately stored for separate uses; also, whereby said pumped air can be exhausted into the open air, while said pumped water is being directed into said storage tank; and further to so arrange and construct said air directing means, that air under pressure, in said separate air storing means, may either be directed therefrom into said pressure tank, or be exhausted into the open air; and to so arrange and connect said directing and storing means, that efficient drainage thereof is obtained; fourth, to so construct and arrange the parts of an air pumping attachment for water pumps, that the same shall be cheap in cost of manufacture and shall be operated with the minimum amount of friction. I attain these objects by the mechanism illustrated in the accompanying drawing, in which;

Figure 1 is a longitudinal section, cut vertically through the center of all the parts. Figs. 2, 3, 4 and 5 are sections, similar to Fig. 1, of the air directing cock, showing the gate of said cock in different positions.

Referring to Fig. 1, air cylinder 1 is connected by nipple 2 with the ordinary pump head 3 connected by supply pipe 4 with the ordinary water cylinder 5, provided with water inlet check valve 6 in the lower end thereof, adapted to admit water 7 from well or source of water 8, into said water cylinder.

Air cylinder 1 is provided with cylinder head 9, in which is mounted the air inlet valve 10, having stem 10', actuated by spring 11, adapted to movably hold said valve in closed position. The tension of said spring is adjusted by nut 12, screwed on said stem and secured in place by lock nut 13. Cylinder head 9 is also provided with air outlet valve 14, adapted to close outlet opening 15, by the gravity of said outlet valve. Said outlet opening is connected by pipe 16 with port 16', formed in air directing four way cock 17, provided with rotatable air directing cock gate 17', adapted to be rotated in said cock by cock handle 17''. Cylinder head 9 is also provided with gland 18, through the center of which piston rod 19 is reciprocatively moved by power (not shown,) applied to journal bearing 19', formed in the upper end thereof. The lower end of said rod is secured to the upper portion of piston 20, provided with leather packings 21 and with water packings 22. In the lower portion of said piston is secured the upper end of plunger rod 23, which extends downward through pipe 4 into water cylinder 5, and has its lower end secured to valve cage 24, secured on water plunger 25. Said valve cage liftably retains valve 26 in place, over valve opening 27, formed through plunger 25.

Pump head 3 is provided with the usual air chamber 28, adapted to overcome water-knock, and is also provided with gated spout 29, opened and closed by spout gate 30, operated by gate rod 31, screwed through spout gland 32 by handle 33.

Water discharge pipes 34 and 34' communicatively connect pump head 3 with pressure tank 35, and are provided with check valve 36, opening toward said pressure tank. Discharge pipe 34' is provided with T connection 37 between check valve 36 and tank 35.

Four way cock 17 has port 38' formed through the lower side thereof, communicatively connected with pressure tank 35 by air discharge pipe 38 provided with union 38″ and with check valve 39, opening toward said tank; also by said T 37 and by the portion of pipe 34′ which connects said T with tank 35, which together with pipe 16 and air discharge port 15, form air directing and air conducting means, whereby air is directed and conducted from cylinder 1 into pressure tank 35.

Through the upper side of cock 17 is the port 41′, communicatively connected with air storage tank 40 by pipe 41. Said tank is provided with pressure gage 40′ and with service cock 40″, with which is connected any desired device, (not shown,) adapted to use air under pressure.

Pressure tank 35 is provided with the usual glass water gage 35′ and with ordinary pressure gage $35^a$, said tank is also provided with service cock 35″, with which any desired pipe system or devices are connected for using water under pressure.

Port 42′ formed through the side of cock 17, is provided with air exhaust pipe 42.

The previously mentioned ports in cock 17, which I shall term inlet port 16′, pressure tank port 38′ air storage tank port 41′ and exhaust port 42′ are opened and closed by cock gate 17′, rotated in said cock by handle 17″, for directing air therethrough, as hereinafter described.

In installation, the well known plunger rod tube, (not shown,) carrying an ordinary plunger rod gland on the upper end thereof is removed from ordinary pump head 3, from the aperture into which nipple 2 is secured; said nipple is then secured in said aperture, and the lower end of air cylinder 1 is secured on said nipple, and together with the thereto attached pipe 4 and water cylinder 5 are secured by ordinary means, (not shown,) in the position seen, with cylinder 5 submerged in water 7, and with air cylinder 1 above said water. The tension of spring 11 is so adjusted as to promptly lift inlet valve 10 to closed position, as seen; four way cock gate 17′ is rotated by handle 17″ to the position seen in Fig. 1, for directing air into storage tank 35. The described pipes, cocks, valves pipe coupling and tanks of any desired sizes and proportions are arranged and connected with said air cylinder and said water cylinder as shown.

In operation, power as previously described, is applied to piston rod 19, thereby reciprocating piston 20 in cylinder 1, and also reciprocating plunger 25 in cylinder 5, thus performing the well known single acting operation of pumping air in cylinder 1 and water in cylinder 5. Water 7 in cylinder 5, is lifted therefrom through pipe 4 into pump head 3, through nipple 2 into the lower end portion of cylinder 1, as seen at 7′, and follows piston 20 throughout the entire up stroke thereof. Water 7′ effectually cools the interior of cylinder 1 and moistens leather packings 21, thereby rendering unnecessary the lubrication with oil of said packings, said cylinder, and piston 20. This thorough cooling of cylinder 1, cools and consequently contracts the air that is pumped therein, thereby adding to the efficiency of the described air pumping attachment, in the pumping of air, as hereinafter described.

During the previously described up stroke of piston 20, air in cylinder 1 is forced therefrom through port 15, and lifts outlet valve 14 to the position seen, after which said air is conducted through the following conducting means into tank 35: pipe 16, cock port 16′, cock 17, past cock gate 17′, through cock port 38′, uppper portion of pipe 38, check valve 39, lower portion of pipe 38, T 37 and thence through part of pipe 34′, into said tank 35. During the described passage of air, valve 36, by the gravity thereof, remains closed, as seen and prevents back flow of air from pipe 34′ into pump head 3.

During each down stroke of plunger 25, valve 6 gravitates to closed position, (not shown,) and valve 26 is lifted to open position by water 7, in said cylinder, which thereafter freely passes through valve opening 27. During the described down stroke of plunger 25, air piston 20 also makes a down stroke, and forces water 7′ from cylinder 1 through the following water conducting means; nipple 2, pump head 3, pipe 34, opening valve 36, thence through a portion of pipe 34′, through T 37, and thence through the remaining portion of pipe 34′, into tank 35.

Piston 20, during the previously described down stroke thereof, causes a vacuum to be formed in the upper end portion of cylinder 1, upon which air outlet valve 14 gravitates to closed position and air inlet valve 10 is moved to open position, (not shown,) by outside atmospheric pressure, refilling cylinder 1 with air. During the described down stroke of piston 20, check valve 39 is closed by gravity, and prevents back flow of air through the described air conducting means.

The previously described operations of pumping air and water into pressure tank 35, is ordinarily continued until said water has reached a predetermined height 7″, visible through glass gage 35′. Should any predetermined pressure of air in the upper portion $35^b$ of said tank, be reached and shown by pressure gage $35^a$, before said water reaches point 7″; cock gate 17′ is rotated to the position seen in Fig. 2, thereby directing pumped air from cock 17 through port 41′ and pipe 41, into air storage tank 40, from whence said air is used for any compressed air purposes, through cock 40″.

When air pressure gage 40′ shows sufficient pressure of air in tank 40, cock gate 17' is rotated to the position seen in Fig. 3, thereby directing air from cock 17, through exhaust port 42' and exhaust pipe 42, into the open air.

Should pressure of air, in upper portion 35<sup>b</sup> of tank 35, be lowered from any cause, said pressure of air can be raised, by rotating cock gate 17' to the position seen in Fig. 4, thereby directing air under pressure from air storage tank 40, through pipe 41, cock port 41', and thence through the described air conducting means, into pressure tank 35.

Should moisture, from condensation, or other cause, accumulate in tank 40, the same is blown therefrom, through pipe 41, port 41', cock 17, exhaust port 42' and exhaust pipe 42, into the open air, upon rotating cock gate 17' to the position seen in Fig. 5.

Water under pressure in pressure tank 35, is used therefrom through cock 35'', for any desired purpose.

Having fully described my invention, what I claim as new and desire to secure by Letters Patent, is:—

In an air pumping attachment for water pumps, in combination; a pressure tank, adapted to store air and water, under pressure; a pump head, having water conducting means, communicatively connecting said pump head with said pressure tank, said water conducting means being provided with a check valve therein, opening toward said pressure tank, and with a T connection, between said pressure tank and said check valve; an air cylinder, having a piston therein, provided with driving means, for reciprocatively driving said piston, said air cylinder having the lower end thereof communicatively connected with the upper side of said pump head, the upper end of said air cylinder being provided with an air inlet valve and an air outlet port, said outlet port having an outlet check valve therefor; single acting water pumping means, communicatively connected with the lower side of said pump head and in alinement with said air cylinder; a plunger for said water pumping means, and driving means connecting said plunger and said piston, whereby said plunger is reciprocatively driven; air conducting means, adapted to conduct air from said air outlet port into said T connection; a check valve in said air conducting means, opening toward said T connection; a four way cock in said air conducting means, said four way cock having an inlet cock port, a pressure tank port, an exhaust port and a storage tank port, formed therein; a rotatable cock gate in said cock, adapted to open and close said ports, as specified, and a cock handle, whereby said cock gate is rotated.

In testimony whereof I affix my signature in the presence of two witnesses.

CALVIN H. MERRILL.

Witnesses:
 Louise Cox,
 Luke E. Hinton.